United States Patent [19]

Riches

[11] 4,128,140
[45] Dec. 5, 1978

[54] APPARATUS FOR RECYCLING ENGINE LUBRICATING OIL

[75] Inventor: Stanley J. W. Riches, Uppingham, England

[73] Assignee: The Post Office, London, England

[21] Appl. No.: 781,052

[22] Filed: Mar. 24, 1977

[30] Foreign Application Priority Data

Mar. 25, 1976 [GB] United Kingdom ............... 12071/76

[51] Int. Cl.² ........................................... F01M 11/04
[52] U.S. Cl. .................................................... 184/1.5
[58] Field of Search ..................... 184/1.5, 6.24, 105 R

[56] References Cited

U.S. PATENT DOCUMENTS

| 1,655,939 | 1/1928 | Copeland | 184/1.5 X |
| 2,479,139 | 8/1949 | Seigel | 184/1.5 |
| 2,612,289 | 9/1952 | Koester | 184/1.5 X |
| 2,820,528 | 1/1958 | Harper | 184/1.5 |
| 3,216,527 | 11/1965 | Lewis | 184/1.5 |
| 3,430,730 | 3/1969 | Kitajima | 184/1.5 |
| 3,867,999 | 2/1975 | Cox | 184/1.5 |
| 3,954,611 | 5/1976 | Reedy | 184/1.5 X |

FOREIGN PATENT DOCUMENTS

| 2231100 | 1/1974 | Fed. Rep. of Germany | 184/1.5 |
| 707315 | 4/1954 | United Kingdom | 184/1.5 |

Primary Examiner—David H. Brown
Attorney, Agent, or Firm—Kemon & Estabrook

[57] ABSTRACT

Equipment for draining and refilling the lubricating oil sump of a motor vehicle comprises a large capacity main oil reservoir. Inlet means to the reservoir from the sump include a vessel which is evacuated to suck oil from the sump and pressurized to cause the oil to flow into the reservoir. Oil rejuvenating means are included in the inlet. Means are provided for discharging a metered dose of oil back to the sump from the reservoir.

6 Claims, 2 Drawing Figures

APPARATUS FOR RECYCLING ENGINE LUBRICATING OIL

This invention relates to a method of recycling engine lubricating oil, i.e. to draining and refilling the sump of a vehicle and to equipment for carrying out this recycling.

In the running of any fleet of regularly used motor vehicles there is a triple requirement regarding engine lubrication:

(i) for cost reasons there is a need to minimise consumption of lubricating oil;

(ii) the servicing of vehicles by drivers should be simple so as to ensure that vehicle engine oil levels are correctly maintained in order to reduce instances of serious engine damage occurring through shortage of lubricating oil owing to the omission of drivers to check and replenish sump levels. It may be noted that failures on the part of drivers can be largely attributed to the difficulty in obtaining access to "dipsticks" and oil filling orifices that are frequently obstructed by engine cowlings;

(iii) material and labour costs associated with the replacement of oil filter elements should be minimised.

According to one aspect the present invention provides equipment for draining and refilling the lubricating oil sump of a motor vehicle, such equipment comprising a main oil reservoir with a capacity substantially greater than that of the sump, oil-inlet means for connecting the interior of the sump to the reservoir, means for causing oil to flow into the reservoir through the oil-inlet means, oil-outlet means for connecting the main reservoir to the vehicle sump and metered oil discharging means for causing metered doses of oil from the reservoir to flow through the oil-outlet means.

According to another aspect the present invention provides a method of draining and refilling the lubricating oil sump of a motor vehicle, such method comprising the steps of withdrawing oil from the sump into a reservoir of replenishment oil filled to a capacity substantially greater than that of the sump, and causing a metered dose of oil from the reservoir to flow back into the sump.

Preferably an oil-collecting vessel is included in the oil-inlet means and a partial vacuum is developed in this vessel thereby causing suction to withdraw oil from the vehicle sump into the equipment. The oil-inlet means preferably includes oil rejuvenation plant i.e. means for removing liquid and solid impurities and these means are conveniently incorporated between the oil-collecting vessel and the main reservoir. The means for establishing partial vacuum in the oil-collecting vessel can, when the vessel is charged with the sump oil, be used to increase the pressure in the vessel thereby causing oil to flow through the oil rejuvenating means into the main reservoir.

The invention will now be described by way of example and with reference to the accompanying schematic plan drawings wherein.

Figure 1:
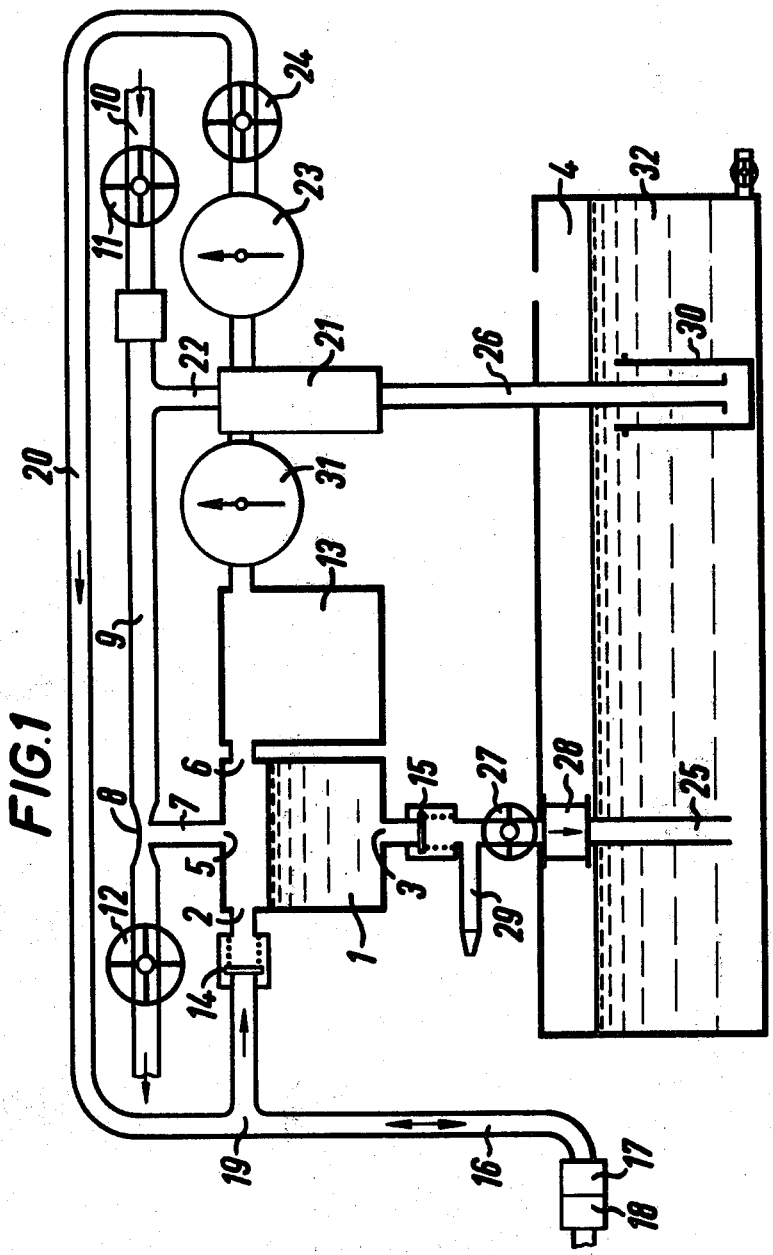
FIG. 1 shows a first embodiment of the invention.

Referring initially to FIG. 1 the equipment illustrated includes an oil collector vessel 1 having an inlet port 2 through which spent oil is delivered into collector vessel 1, an outlet port 3 through which oil can be passed to a main storage reservoir 4 which has a capacity many times greater than that of the collector vessel 1. The collector vessel 1 has additional ports 5 and 6; the port 5 is bounded by a conduit 7 which provides fluid communication between the interior of the collector vessel 1 and a venturi constriction 8 in a pressure conduit 9. The pressure conduit 9 communicates at one end 10 with a pneumatic compressor (not shown), the air pressure in the conduit 9 and thus in the collector vessel 1 being controlled by the condition of valves 11 and 12. The port 6 communicates with an air vessel 13 whose function will be explained presently.

Inlet and outlet pipes to the respective ports 2 and 3 have pressure-operated one-way valves 14 and 15, the valve 14 operating on establishment of a partial vacuum in the collector vessel 1 and the valve 15 operating on establishment of an excess pressure in the vessel 1.

The inlet pipe to the collector vessel 1 communicates with a hoseline 16 for transferring spent oil from, and replacement oil to, the sump of a motor vehicle. For this purpose, the hoseline 16 is provided with a snap-on fixture (shown schematically at 17 which can be sealingly affixed to a valve (shown schematically at 18) provided in the wall of the motor vehicle or in the end of a leader pipe from the sump of the motor vehicle engine (not shown).

The hoseline 16 forks at 19 to provide the inlet pipe for conveying spent oil to the collector vessel 1 and to provide a replenishment pipe 20 along which replacement oil can be pumped to the vehicle sump.

For pumping the replacement oil a pump 21 operated by air pressure set up in a conduit 22 communicating with the conduit 9 is provided. A meter 23 gauges the volume of oil flowing along the pipe 20, this volume being controlled by the state of a valve 24.

Conduits 25 and 26 lead down from the collector vessel 1 and the pump 21 respectively. The conduit 25 is interrupted by a flow regulation control valve 27 and a plant 28 which serves the joint function of extracting moisture and filtering out solid particles of 2 microns size and above. Intermediate the one-way valve 15 and the control valve 27 a conduit 29 is provided having a snap-on hose connection. The conduit enables spent oil to be directed to an external receiver. This facility is used to cease the flow of spent oil to reservoir 4 during renewal of the oil in the latter. The conduit 26 is enclosed in a cup-shaped vessel 30 which inhibits sediment collecting in the bottom of the storage reservoir 4 from being drawn up the conduit 26 when the pump 21 operates.

To initiate use of the recycling apparatus, the storage reservoir is filled to the level shown with unused lubricating oil. The volume of oil in the storage reservoir can be of the order of fifty or sixty times that to be expected in individual engines of the vehicles using the recycling apparatus.

When a vehicle is brought into a depot for refuelling and other regular servicing, it is taken to the recycling apparatus and the fixture 17 is snapped over the oil exhaust valve 18 at the top of a riser pipe leading to a sump aperture.

With the valves 11 and 12 fully open, the pneumatic compressor is operated to pass air along the conduit 9, the venturi constriction 8 thereby establishing a partial vacuum in the collector vessel 1. The excessive atmospheric pressure acting on the surface of oil in the vehicle sump over the pressure obtaining in the collector vessel 1 causes the used or spent sump oil to be transferred from the engine sump through the port 2 to the collector vessel. When all the spent oil has been extracted from the sump, the hermetic seal between the collector vessel and the sump caused by the presence of oil in the hoseline 16 is broken and the partial vacuum destroyed. A vacuum gauge 31 provides an indication of the sump being empty when the vacuum reading falls.

The valve 12 is then closed thereby causing the air space in the collector vessel to be pressurised. This pressure acts both to close the non-return valve 14 and to open the non-return valve 15. The spent oil in the collector vessel 1 is then forced through the moisture extraction and filtration plant 28 to partially rejuvenate it before it is discharged into and merges with the body of oil 32 in the reservoir 4.

The valve 24 is then opened and replacement oil under pressure from the pump 21 is passed via the meter 23, conduit 20 and hoseline 16 into the engine sump.

The capacity flow through the plant 28 is adjusted by valve 27 to be somewhat less than the capacity delivery rate of the oil dispensing pump 21. This ensures that there is sufficient air pressure in the collector vessel 1 to continue the pressurisation of the oil to keep the non-return valve 14 closed during the oil replenishing operation. The air vessel 13 augments the air space of the collector vessel 1 and provides for a residual air pressure to act on the surface of the spent oil to continue the filtration operation after the closure of the valve 11 cuts off the compressed air supply to the system.

The speed of operation of the apparatus allows engine oils to be changed by drivers as part of normal re-fuelling operations; e.g., draining and re-filling of a vehicle with a sump capacity of one gallon is approximately two minutes. One advantage of the apparatus is that drivers need not check oil levels since they use the apparatus to extract what oil is present in the sump and re-fill with the prescribed quantity for the particular type of vehicle being fuelled.

Since the oil in a fleet vehicle is regularly filtered there is little requirement for a vehicle filter element. If desired the filter elements and hence the time taken to change them can be dispensed with; but, if retained, the recycling apparatus extends the useful life of vehicle filter elements.

The level of oil in the storage reservoir 4 may be topped-up daily by additions of new oil — the amount added representing that lost and burned by vehicle operations over one day — protective additives can be added in the daily "topping up" of new oil to compensate in part for the accruing loss in additive protection and chemical deterioration. The rate of protective additive loss and chemical deterioration of the main body of oil held in the reservoir is retarded to an extent permitting continual recycling until such time that a chemical analysis indicates that the oil in the reservoir should be changed.

Figure 2:
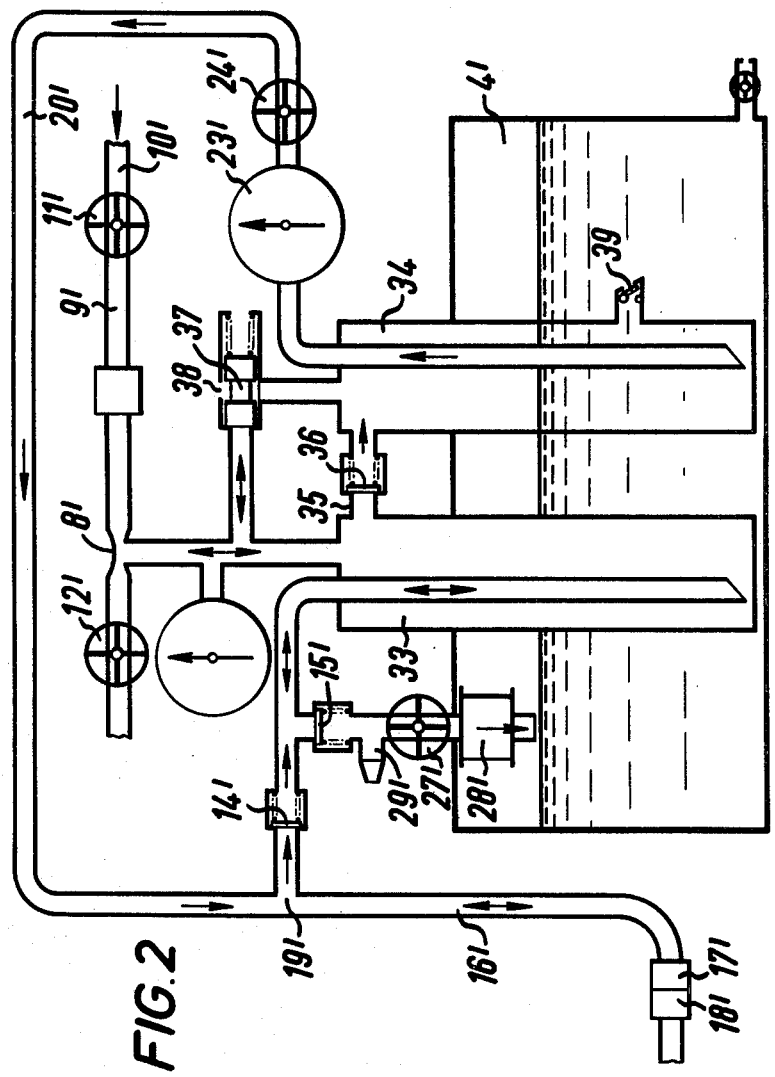
FIG. 2 shows a second embodiment of the invention.

In the embodiment of the invention described with reference to FIG. 2 the pump 21 of FIG. 1 is dispensed with and replaced by means for directly pressurising the oil to be dispensed by compressed air. Similar integers to those described in the embodiment of FIG. 1 are identified with similar numerals but with a stroke '.

In this embodiment two reservoir vessels are used as in the original design but in this design they now perform different functions.

In this design the hermetically sealed vessels 33 and 34 stand vertically in the main oil reservoir 4'. The vessel 33 performs the dual function of drained oil reservoir in the lower part and air reservoir in the upper part. The vessel 34 is the oil dispensing reservoir. The two vessels 33 and 34 are in connection via a connecting pipe 35 containing a uni-directional valve 36.

In this embodiment the engine sump oil is extracted into the drained oil reservoir i.e. the lower part of vessel 33 under a vacuum and is discharged under pressure through a uni-directional valve 15' and an oil rejuvenation plant 28' with an intermediate oil-discharge conduit 29' as in the previous embodiment. In this embodiment when a vacuum is created in the air space in vessel 33 the uni-directional valve 36 also closes, thus preventing any vacuum being established in vessel 34. Also, simultaneously a shuttle valve 37 moves under the influence of the differential pressure on it created by the vacuum in vessel 33 to open the atmospheric vent 38 to vessel 34. As in the previous embodiment vacuum and air pressure are generated by a venturi 8' and associated parts.

When atmospheric pressure obtains in vessel 34 i.e. when a state of no positive pressure obtains in vessel 33, replenishing oil will flow from the main reservoir via a uni-directional valve 39 into the vessel 34.

The oil level that will be reached in vessel 34 will be common to that in the main reservoir.

When air pressure is applied in vessel 33 to discharge the drained oil via the oil rejuvenating system 28 into the main reservoir 4', the valve 36 is caused to open and this allows a pressure to be established in vessel 34.

Simultaneously, a differential pressure now acts on the shuttle valve 37, the excess pressure acting on it via vessel 33 moves it to close the atmospheric vent 38 to vessel 34 which causes vessel 34 to be pressurised and to close the oil inlet uni-directional valve 39.

The oil in vessel 34 is then pressurised and can be dispensed via the meter 23' and control valve 24' to the engine sump.

In both the embodiments described the venturi 8 and associated parts can be replaced by a pump operated suction device.

I claim:

1. Equipment for draining and refilling the lubricating oil sump of a motor vehicle, such equipment comprising a main oil reservoir with a capacity substantially greater than that of the sump, oil inlet means including a hose line and an inlet pipe for connecting the interior of the sump to the reservoir, and an oil collecting vessel having an inlet and an outlet and being of greater capacity then said sump but less then said reservoir interposed in said oil inlet means, valve means communicating with the inlet and the outlet of said oil collecting vessel, means for reducing and increasing air pressure in the oil collecting vessel, said last named means upon reducing air pressure causing said inlet valve to open causing oil to flow through said hose line and inlet pipe into said oil collecting vessel while preventing flow from said collecting vessel to said reservoir and upon increasing air pressure in said oil collecting vessel to cause oil to flow through said outlet pipe into said reservoir while closing the valve means communicating with the oil inlet of said vessel, oil outlet means communicating with said reservoir and connecting with said reservoir and connecting said reservoir to the vehicle sump and metered oil discharge means for causing metered doses of oil from the reservoir to flow through the oil outlet means.

2. Equipment as claimed in claim 1 including means for removing liquid and solid impurities intermediate the oil-collecting vessel and the main reservoir.

3. Equipment as claimed in claim 1 including means for diverting oil from the equipment intermediate the oil-collecting vessel and the main reservoir.

4. Equipment as claimed in claim 1 wherein the oil-discharging means comprises a separate oil pumping device.

5. Equipment as claimed in claim 1 wherein the said means for reducing and raising pressure in the oil-collecting vessel are selectively actuable to raise pressure in an oil discharge vessel selectively communicable with the main reservoir and to discharge oil from said oil discharging vessel back to the vehicle sump.

6. Equipment as claimed in claim 1 wherein the said means for reducing pressure is a venturi device.

* * * * *